June 23, 1953  H. E. STRAUSSER  2,642,729
SHAFT COUPLING
Filed Nov. 27, 1948
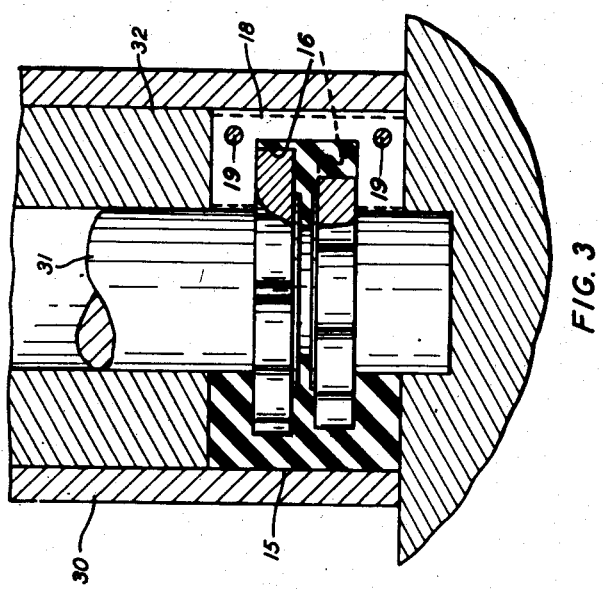
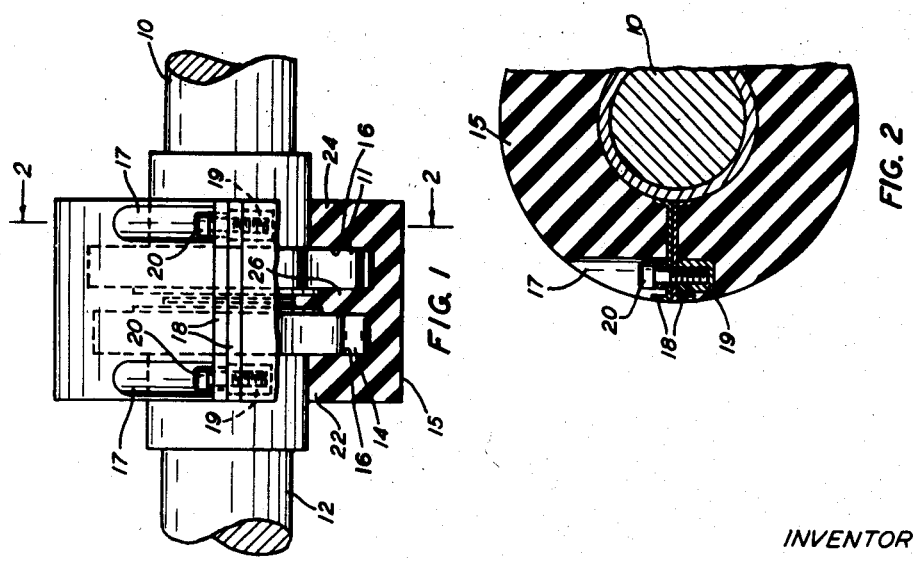
INVENTOR
*H. E. STRAUSSER*
BY
ATTORNEY

UNITED STATES PATENT OFFICE 2,642,729

SHAFT COUPLING

Harry E. Strausser, Middle River, Md., assignor to Western Electric Company, Incorporated, New York, N. Y., a corporation of New York Application November 27, 1948, Serial No. 62,392

2 Claims. (Cl. 64—11)

This invention relates to shaft couplings, and more particularly to resilient shaft couplings.

In the use of machinery in which a driving unit is mounted in a juxtaposed position with respect to a driven unit and the shafts of both units are mounted in aligned and abutting relationship, it is difficult to connect the shafts of the two units resiliently and silently. In the past, there has been no coupling which serves to connect two juxtaposed shafts resiliently with the ability to disconnect the shafts and substitute couplings without moving the shaft of one of the units away from the shaft of the other unit. Such movement of one of the shafts often requires movement of the entire unit associated therewith.

An object of the invention is to provide new and improved shaft couplings.

A further object of the invention is to provide new and improved resilient shaft couplings.

Another object of the invention is to provide new and improved couplings for juxtaposed shafts in which the couplings may be removed from the shafts without moving one of the shafts axially with respect to the other.

A shaft coupling illustrating certain features of the invention may include a driving shaft, a driven shaft mounted in closely spaced position with respect to and in alignment with the driving shaft, a sleeve of elastic material split substantially parallel to the longitudinal axis thereof, and means for clamping the sleeve to the shafts, whereby the driving shaft drives the driven shaft through the sleeve.

A complete understanding of the invention may be obtained from the following detailed description of a shaft coupling forming a specific embodiment thereof, when read in conjunction with the appended drawing, in which:

Fig. 1 is a longitudinal view of a shaft coupling forming one embodiment of the invention;

Fig. 2 is a fragmentary section taken along line 2—2 of Fig. 1, and

Fig. 3 is a sectional view of a molding apparatus for forming an element of the shaft coupling shown in Figs. 1 and 2.

Referring now in detail to the drawing, there is shown therein a driving shaft 10 having a sprocket 11 secured fixedly thereon, and a driven shaft 12 having a sprocket 14 mounted fixedly thereon. These two shafts are connected by a flexible, split ring 15 composed of a tough flexible elastomeric compound, such as, for example, a rubber compound, a polymerized chloroprene compound, or the like, having indentations 16—16 formed therein to match the teeth of the sprockets 11 and 14. In order to connect the driving shaft 10 to the driven shaft 12, the flexible ring is opened up and fitted over the sprockets 11 and 14 so that the teeth of the sprockets mesh in the indentations 16—16 in the ring. The indentations receiving the teeth of the sprocket 11 are staggered with respect to the indentations receiving the teeth of the sprocket 14.

The ring 15 is provided with grooves 17—17 adjacent to the line where the bushing is slit. A pair of matching metallic end plates 18—18 are bonded to the elastomeric compound at the surfaces formed by the slit in the ring and flanges on the ends thereof grip the ring. The metallic end plates 18—18 are forced toward one another by means of knurled, tapped bushings 19—19 embedded in the ring and cap screws 20—20. With the ring fixed firmly in place, the driving and driven shafts 10 and 12 are connected in a semirigid manner so that power may be transmitted thereby, but slight relative movement between the shafts is permitted to prevent shock.

End flanges 22 and 24 and a center flange 26 give strength to the flexible ring 15 and take thrust. The flange 26 permits slight relative axial movement between the shafts. For example, where the driving shaft 10 is driven by an electric motor, the flange 26 permits the rotor of the motor to center itself so that the motor does not become overheated.

The ring 15 is made by forming and vulcanizing a suitable elastomeric compound in a mold 30 around a mold insert 31 having the general contour of the coupling against the end plates 18—18 and around the bushings 19—19. The elastomeric material is forced into the mold 30 around the insert 31 by means of a ram 32, and vulcanized therein while under pressure. The insert and the material molded therearound then are removed from the mold. A cutting element is inserted between the end plates and a portion of the ring in that plane is severed. That is, the portion of one side of the ring in the plane of the junction of the plates 18—18 but not separated thereby is severed. The coupling then is pulled away from the insert 31, and is removed therefrom. The grooves 17—17 may be either molded in the ring when it is originally formed by providing a suitable insert in the mold 30, or may be cut out of the ring after the ring has been molded. It is obvious that the teeth of the sprockets 11 and 14 need not be exactly the same contour as is shown on the drawing, and might be of any suitable roughened configuration.

The flexible ring 15 may be opened sufficiently wide to place it over the sprockets 11 and 14 with the end plates 18—18 passing over the sprockets, and the ring 15 may be flexed sufficiently to remove the ring from the sprockets with the end plates passing over the sprockets. Thus, the shafts 10 and 12 may be disconnected and connected without the necessity of moving the shafts axially.

What is claimed is:

1. A flexible, detachable coupling for connecting an end of a driving shaft with an aligned and closely spaced end of a driven shaft, which comprises a pair of sprockets secured one for each to the closely spaced ends of said shafts, each of said sprockets having a plurality of teeth which are directed radially outwardly with respect to the shafts, a cylindrical, elastic rubber sleeve having a longitudinal split on only one side thereof leading to internal indentations matching the teeth on the sprockets so that the sleeve may be removably positioned to envelope the sprockets, the indentations receiving the teeth of one of the sprockets being staggered with respect to the indentations receiving the teeth of the other sprocket, and a pair of connecting elements anchored to the faces formed by the split in the sleeve for fastening said faces together to secure the sleeve in position when it envelopes the sprockets.

2. A flexible, detachable coupling for connecting an end of a driving shaft with an aligned and closely spaced end of a driven shaft, which comprises a pair of sprockets secured one for each to the closely spaced ends of said shafts, each of said sprockets having a plurality of teeth which are directed radially outwardly with repect to the shafts, a cylindrical, elastic sleeve composed of an elastomeric compound and having a longitudinal split on only one side thereof leading to internal indentations matching the teeth on the sprockets so that the sleeve may be removably positioned to envelope the sprockets, and a pair of connecting elements anchored to the faces formed by the split in the sleeve for fastening said faces together to secure the sleeve in position when it envelopes the sprockets.

HARRY E. STRAUSSER.

References Cited in the file of this patent

UNITED STATES PATENTS

| Number | Name | Date |
|---|---|---|
| 1,646,427 | Skidmore, Jr. | Oct. 25, 1927 |
| 2,045,565 | Belcher | June 30, 1936 |
| 2,079,460 | Marty | May 4, 1937 |
| 2,146,898 | Johnson et al. | Feb. 14, 1939 |
| 2,251,804 | Reuter et al. | Aug. 5, 1941 |